US008972920B1

(12) United States Patent
Gasparyan et al.

(10) Patent No.: US 8,972,920 B1
(45) Date of Patent: Mar. 3, 2015

(54) RE-BUDGETING CONNECTIONS OF A CIRCUIT DESIGN

(71) Applicant: Xilinx, Inc., San Jose, CA (US)

(72) Inventors: Grigor S. Gasparyan, San Jose, CA (US); Dinesh D. Gaitonde, Fremont, CA (US); Yau-Tsun S. Li, Cupertino, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 14/178,035

(22) Filed: Feb. 11, 2014

(51) Int. Cl.
*G06F 17/50* (2006.01)

(52) U.S. Cl.
CPC ........ *G06F 17/5081* (2013.01); *G06F 17/5031* (2013.01); *G06F 17/50* (2013.01)
USPC ........... 716/113; 716/108; 716/123; 716/132; 716/134; 716/136

(58) Field of Classification Search
CPC . G06F 17/50; G06F 17/5031; G06F 2217/84; G06G 17/5081
USPC .................. 716/108, 113, 123, 132, 134, 136
See application file for complete search history.

(56) References Cited

U.S. PATENT DOCUMENTS

| | | | | |
|---|---|---|---|---|
| 5,778,216 A * | 7/1998 | Venkatesh | ...................... | 713/503 |
| 5,815,406 A * | 9/1998 | Golla et al. | ................... | 716/113 |
| 6,233,724 B1 * | 5/2001 | LaBerge | ........................ | 716/104 |
| 6,622,291 B1 * | 9/2003 | Ginetti | .......................... | 716/108 |
| 6,647,541 B2 * | 11/2003 | LaBerge | ........................ | 716/102 |
| 6,658,628 B1 * | 12/2003 | Landy et al. | .................... | 716/103 |
| 6,845,494 B2 * | 1/2005 | Burks et al. | .................... | 716/108 |
| 7,010,763 B2 * | 3/2006 | Hathaway et al. | ............. | 716/132 |
| 7,111,268 B1 * | 9/2006 | Anderson et al. | ............. | 716/113 |
| 7,207,020 B1 * | 4/2007 | Fung et al. | ..................... | 716/113 |
| 7,365,568 B1 * | 4/2008 | Trimberger | ...................... | 326/41 |
| 7,512,922 B1 * | 3/2009 | Stenz | .............................. | 716/119 |
| 7,559,040 B1 * | 7/2009 | Albrecht et al. | .............. | 716/132 |
| 7,636,907 B1 * | 12/2009 | Das et al. | ....................... | 716/138 |
| 7,797,601 B2 * | 9/2010 | Kapur et al. | ................... | 714/726 |
| 7,895,556 B2 * | 2/2011 | Kotecha et al. | ............... | 716/108 |
| 7,904,861 B2 * | 3/2011 | Buehler et al. | ................ | 716/108 |
| 8,082,532 B1 * | 12/2011 | Stenz et al. | ..................... | 716/123 |
| 8,196,083 B1 * | 6/2012 | Kong | ............................. | 716/126 |
| 8,250,509 B2 * | 8/2012 | Daede et al. | ................... | 716/113 |
| 8,302,049 B2 * | 10/2012 | Musante et al. | .............. | 716/108 |
| 8,336,010 B1 * | 12/2012 | Chang et al. | ................... | 716/108 |
| 8,368,428 B2 * | 2/2013 | Tran Vo et al. | ................... | 326/93 |
| 8,473,884 B2 * | 6/2013 | Daede et al. | ................... | 716/108 |
| 8,504,970 B1 * | 8/2013 | Malhotra et al. | .............. | 716/134 |
| 8,578,321 B2 * | 11/2013 | Iyer et al. | ....................... | 716/133 |
| 8,860,502 B2 * | 10/2014 | Gemmeke et al. | ............. | 327/538 |
| 2012/0066658 A1 * | 3/2012 | Chowdhury et al. | ......... | 716/120 |

* cited by examiner

*Primary Examiner* — Helen Rossoshek
(74) *Attorney, Agent, or Firm* — Kevin T. Cuenot

(57) ABSTRACT

Re-budgeting connections includes detecting a budget event for a circuit design and, responsive to detecting the budget event, calculating, using a processor, a delta for a selected combinatorial circuit element of the circuit design using an incoming slack and an outgoing slack of the selected combinatorial circuit element. Using the processor, a delay budget for a connection of the selected combinatorial circuit element is adjusted using the delta responsive to detecting the budget event.

17 Claims, 4 Drawing Sheets

RE-BUDGETING CONNECTIONS OF A CIRCUIT DESIGN

TECHNICAL FIELD

This disclosure relates to integrated circuits (ICs) and, more particularly, to re-budgeting connections of a circuit design for implementation within an IC.

BACKGROUND

Integrated circuits (ICs) can be implemented to perform a variety of functions. Some ICs can be programmed to perform specified functions. One example of an IC that can be programmed is a field programmable gate array (FPGA). An FPGA typically includes an array of programmable tiles. These programmable tiles may include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect circuitry and programmable logic circuitry. The programmable interconnect circuitry typically includes a large number of interconnect lines of varying lengths interconnected or coupled by programmable interconnect points (PIPs). The programmable logic circuitry implements the logic of a user design using programmable elements that may include, for example, function generators, registers, arithmetic logic, and so forth.

The programmable interconnect and programmable logic circuitries are typically programmed by loading a stream of configuration data into internal configuration memory cells that define how the programmable elements are configured. The configuration data may be read from memory (e.g., from an external programmable read-only memory or PROM) or written into the FPGA by an external device. The collective states of the individual memory cells then determine the function of the FPGA.

Another type of programmable IC is the complex programmable logic device, or CPLD. A CPLD includes two or more "function blocks" connected together and to input/output (I/O) resources by an interconnect switch matrix. Each function block of the CPLD includes a two-level AND/OR structure similar to those used in programmable logic arrays (PLAs) and programmable array logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable ICs, the functionality of the device is controlled by data bits provided to the device for that purpose. The data bits may be stored in volatile memory (e.g., static memory cells, as in FPGAs and some CPLDs), in non-volatile memory (e.g., FLASH memory, as in some CPLDs), or in any other type of memory cell.

Other programmable ICs are programmed by applying a processing layer, such as a metal layer, that programmably interconnects the various elements on the device. These programmable ICs are known as mask programmable devices. Programmable ICs may also be implemented in other ways, e.g., using fuse or antifuse technology. The phrase "programmable IC" may include, but is not limited to these devices and further may encompass devices that are only partially programmable. For example, one type of programmable IC includes a combination of hard-coded transistor logic and a programmable switch fabric that programmably interconnects the hard-coded transistor logic.

In order to implement a circuit design within an IC such as a programmable IC, the circuit design undergoes synthesis, mapping, placement, and routing. Synthesis generally refers to the process of converting an abstract, programmatic description of a circuit into a low-level design implementation. The abstract programmatic description of the circuit describes behavior of the circuit and, as such, is often referred to as a "behavioral description" of the circuit. The behavioral description of the circuit is also referred to as a register transfer level (RTL) description and is specified using a hardware description language (HDL). The low level design implementation generated through synthesis typically is specified as inter-connected logic gates.

Once synthesized, the resulting low-level circuit design is mapped, placed, and routed. Mapping is the process of correlating, or matching, the logic gates of the low-level circuit design to the types of actual circuit blocks or resources available in the particular IC in which the circuit design is to be implemented, i.e., the "target IC." For example, one or more logic gates may be mapped to a single lookup table as the lookup table may implement a more complex logic function. The mapped circuit design specifies the same functionality as the low level circuit design, albeit in terms of the particular circuit blocks available on the target IC as opposed to lower-level logic gates.

Placement refers to the assignment of elements of the mapped circuit design to particular instances of the actual circuit blocks or resources on the target IC. Once placed, a circuit element of the circuit design has a specific location on the target IC corresponding to the instance of the circuit block and/or resource assigned thereto. Routing is the process of selecting particular routing resources such as wires, PIPs, and/or other interconnect circuitry to electrically couple the various circuit blocks of the target IC.

One technique used during place and/or route is delay budgeting. For each signal path (path) of the circuit design, a signal must be able to traverse the path within a finite and specified amount of time. The endpoints of a path are synchronous, or clocked, circuit elements. One or more combinatorial, e.g., un-clocked, circuit elements may be included within the path. Each segment of the path, referred to as a connection, has endpoints of: a synchronous circuit element and a combinatorial circuit element; a first combinatorial circuit element and a second combinatorial circuit element; or a combinatorial circuit element and a synchronous circuit element. Each connection may be allocated a portion of the maximum delay of the path referred to as a "delay budget." The EDA tool operates upon connections of the path as opposed to the path as a whole.

Using delay budgets, the EDA tool performs placement and/or routing in a manner that seeks to optimize the circuit by avoiding delay budget violations. A delay budget violation is where the estimated delay of a connection exceeds the delay budget for the connection. With conventional EDA tools, the delay budgets are kept static during placement and routing operations. Treating delay budgets as static, however, results in out-of-date delay budgets that impose artificial constraints on the placement and/or routing processes, thereby limiting solution exploration. In consequence, sub-optimal placements and routings of the circuit design may result.

SUMMARY

A method includes detecting a budget event for a circuit design. Responsive to detecting the budget event, the method includes calculating, using a processor, a delta for a selected combinatorial circuit element of the circuit design using an incoming slack and an outgoing slack of the selected combinatorial circuit element. The method further includes adjusting, using the processor, a delay budget for a connection of the selected combinatorial circuit element using the delta responsive to detecting the budget event.

The method may include determining a combinatorial circuit element from a plurality of combinatorial circuit elements of the circuit design as the selected combinatorial circuit element according to whether a connection of the combinatorial circuit element meets a selected criterion.

Calculating the delta may include subtracting the outgoing slack of the selected combinatorial circuit element from the incoming slack of the selected combinatorial circuit element and dividing a result of the subtraction by two.

In one aspect, the budget event is a change in placement of the circuit design. In another aspect, the budget event is a change in routing of the circuit design.

Adjusting the delay budget may include, responsive to determining that a connection of the selected combinatorial circuit element is an incoming connection, subtracting the delta from the delay budget of the connection. Adjusting the delay budget may include, responsive to determining that a connection of the selected combinatorial circuit element is an outgoing connection, adding the delta to the delay budget of the connection.

A system includes a processor programmed to initiate executable operations. The executable operations include detecting a budget event for a circuit design and, responsive to detecting the budget event, calculating a delta for a selected combinatorial circuit element of the circuit design using an incoming slack and an outgoing slack of the selected combinatorial circuit element. The executable operations further include adjusting a delay budget for a connection of the selected combinatorial circuit element using the delta responsive to detecting the budget event.

The processor may be programmed to initiate executable operations including determining a combinatorial circuit element from a plurality of combinatorial circuit elements of the circuit design as the selected combinatorial circuit element according to whether a connection of the combinatorial circuit element meets a selected criterion.

Calculating the delta may include subtracting the outgoing slack of the selected combinatorial circuit element from the incoming slack of the selected combinatorial circuit element and dividing a result of the subtraction by two.

In one aspect, the budget event is a change in placement of the circuit design. In another aspect, the budget event is a change in routing of the circuit design.

Adjusting the delay budget may include, responsive to determining that a connection of the selected combinatorial circuit element is an incoming connection, subtracting the delta from the delay budget of the connection. Adjusting the delay budget may include, responsive to determining that a connection of the selected combinatorial circuit element is an outgoing connection, adding the delta to the delay budget of the connection.

A non-transitory computer-readable medium includes instructions stored thereon. The instructions, when executed by a processor, perform a method. The method includes detecting a budget event for a circuit design. Responsive to detecting the budget event, the method includes calculating, using the processor, a delta for a selected combinatorial circuit element of the circuit design using an incoming slack and an outgoing slack of the selected combinatorial circuit element and adjusting, using the processor, a delay budget for a connection of the selected combinatorial circuit element using the delta responsive to detecting the budget event.

The method may include determining a combinatorial circuit element from a plurality of combinatorial circuit elements of the circuit design as the selected combinatorial circuit element according to whether a connection of the combinatorial circuit element meets a selected criterion.

Calculating the delta may include subtracting the outgoing slack of the selected combinatorial circuit element from the incoming slack of the selected combinatorial circuit element and dividing a result of the subtraction by two.

In one aspect, the budget event is a change in placement of the circuit design. In another aspect, the budget event is a change in routing of the circuit design.

Adjusting the delay budget may include, responsive to determining that a connection of the selected combinatorial circuit element is an incoming connection, subtracting the delta from the delay budget of the connection. Adjusting the delay budget may include, responsive to determining that a connection of the selected combinatorial circuit element is an outgoing connection, adding the delta to the delay budget of the connection.

BRIEF DESCRIPTION OF THE DRAWINGS

FIGS. 4-1 through 4-3 are block diagrams illustrating calculation of a delta and adjustment of delay budgets using the delta as described with reference to the exemplary method of FIG. 3.

DETAILED DESCRIPTION

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to re-budgeting connections of a circuit design for implementation within an IC. In accordance with the inventive arrangements described within this disclosure, connections are dynamically re-budgeted during placement and/or routing. A connection may be re-budgeted responsive to any of a variety of different budget events. For example, responsive to a budget event such as an atomic placement operation and/or an atomic routing operation, one or more or all connections of a circuit design may be re-budgeted.

Re-budgeting connections dynamically, e.g., responsive to a budget event, rather than using unchanging delay budgets, allows the placement and/or routing tools to explore a larger number of circuit implementation options. Exploration of a larger number of circuit implementation options increases the likelihood of obtaining a higher quality placement and/or a higher quality routing for the circuit design. By comparison, use of unchanging delay budgets often artificially constrains exploration of different circuit implementation options by the placement and/or routing tools, thereby resulting in a lower quality placement and/or routing for the circuit design.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1:
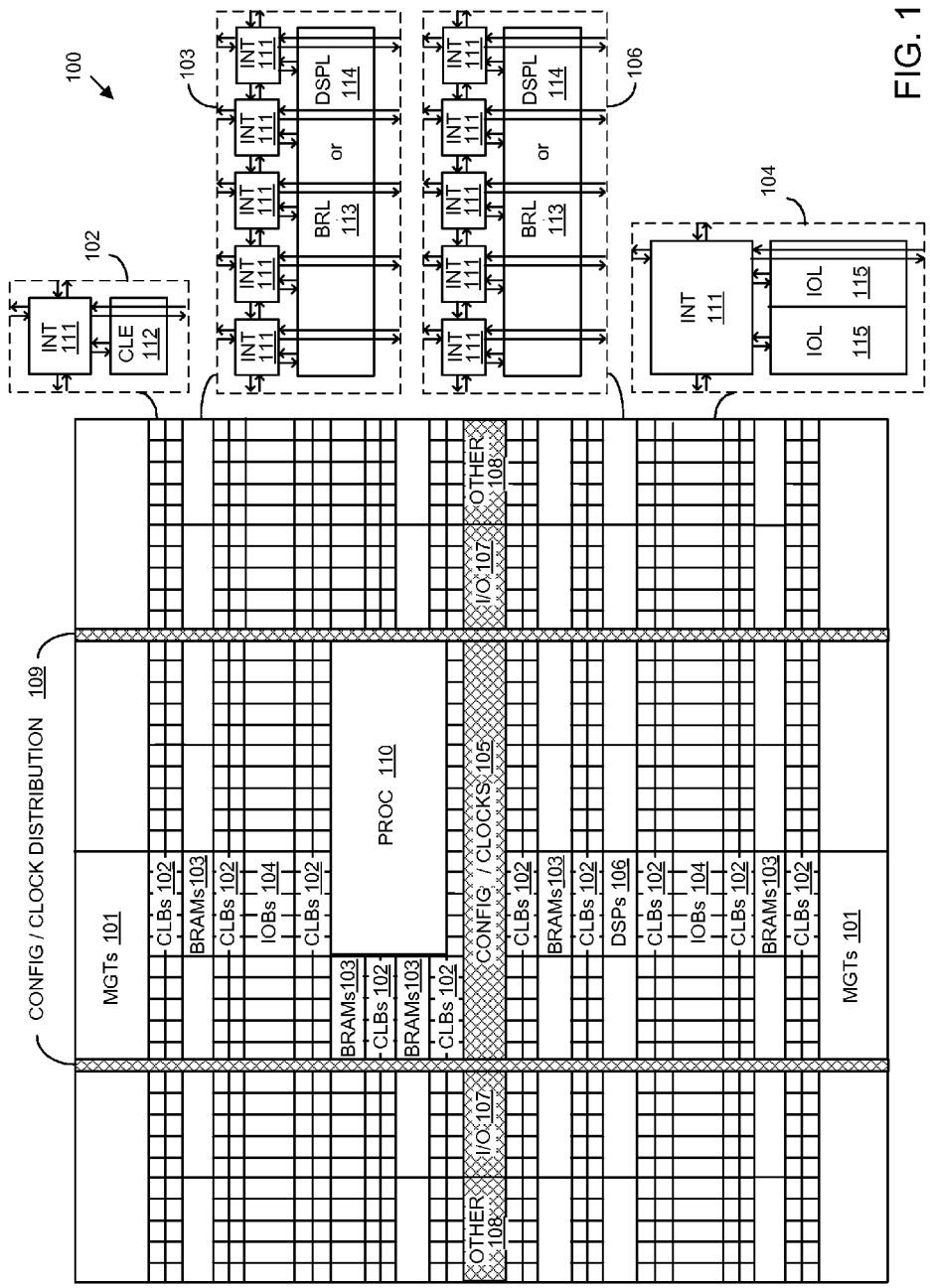
FIG. 1 is a block diagram illustrating an exemplary architecture for an integrated circuit (IC).

FIG. 1 is a block diagram illustrating an exemplary architecture 100 for an IC. In one aspect, architecture 100 is implemented within a field programmable gate array (FPGA) type of IC. As shown, architecture 100 includes several different types of programmable circuit, e.g., logic, blocks. For example, architecture 100 may include a large number of different programmable tiles including multi-gigabit transceivers (MGTs) 101, configurable logic blocks (CLBs) 102, random access memory blocks (BRAMs) 103, input/output blocks (IOBs) 104, configuration and clocking logic (CONFIG/CLOCKS) 105, digital signal processing blocks (DSPs) 106, specialized I/O blocks 107 (e.g., configuration ports and clock ports), and other programmable logic 108 such as digital clock managers, analog-to-digital converters, system monitoring logic, and so forth.

In some ICs, each programmable tile includes a programmable interconnect element (INT) 111 having standardized connections to and from a corresponding INT 111 in each adjacent tile. Therefore, INTs 111, taken together, implement the programmable interconnect structure for the illustrated IC. Each INT 111 also includes the connections to and from the programmable logic element within the same tile, as shown by the examples included at the top of FIG. 1.

For example, a CLB 102 may include a configurable logic element (CLE) 112 that may be programmed to implement user logic plus a single INT 111. A BRAM 103 may include a BRAM logic element (BRL) 113 in addition to one or more INTs 111. Typically, the number of INTs 111 included in a tile depends on the height of the tile. As pictured, a BRAM tile has the same height as five CLBs, but other numbers (e.g., four) also may be used. A DSP tile 106 may include a DSP logic element (DSPL) 114 in addition to an appropriate number of INTs 111. An 10B 104 may include, for example, two instances of an I/O logic element (IOL) 115 in addition to one instance of an INT 111. As will be clear to those of skill in the art, the actual I/O pads connected, for example, to IOL 115 typically are not confined to the area of IOL 115.

In the example pictured in FIG. 1, a columnar area near the center of the die, e.g., formed of regions 105, 107, and 108, may be used for configuration, clock, and other control logic. Horizontal areas 109 extending from this column are used to distribute the clocks and configuration signals across the breadth of the programmable IC.

Some ICs utilizing the architecture illustrated in FIG. 1 include additional circuit blocks that disrupt the regular columnar structure making up a large part of the IC. The additional circuit blocks may be programmable blocks and/or dedicated circuitry. For example, a processor block depicted as PROC 110 spans several columns of CLBs and BRAMs.

In one aspect, PROC 110 is implemented as a dedicated circuitry, e.g., as a hard-wired processor, that is fabricated as part of the die that implements the programmable circuitry of the IC. PROC 110 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 110 is omitted from architecture 100 and replaced with one or more of the other varieties of the programmable blocks described. Further, such blocks may be utilized to form a "soft processor" in that the various blocks of programmable circuitry may be used to form a processor that executes program code as is the case with PROC 110.

The phrase "programmable circuitry" may refer to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 1 that are external to PROC 110 such as CLBs 103 and BRAMs 103 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements or instantiates a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 110.

In some instances, hardwired circuitry may have one or more operational modes that may be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

FIG. 1 is intended to illustrate an exemplary architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 1 are purely exemplary. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 110 within the IC are for purposes of illustration only and are not intended as a limitation.

Figure 2:
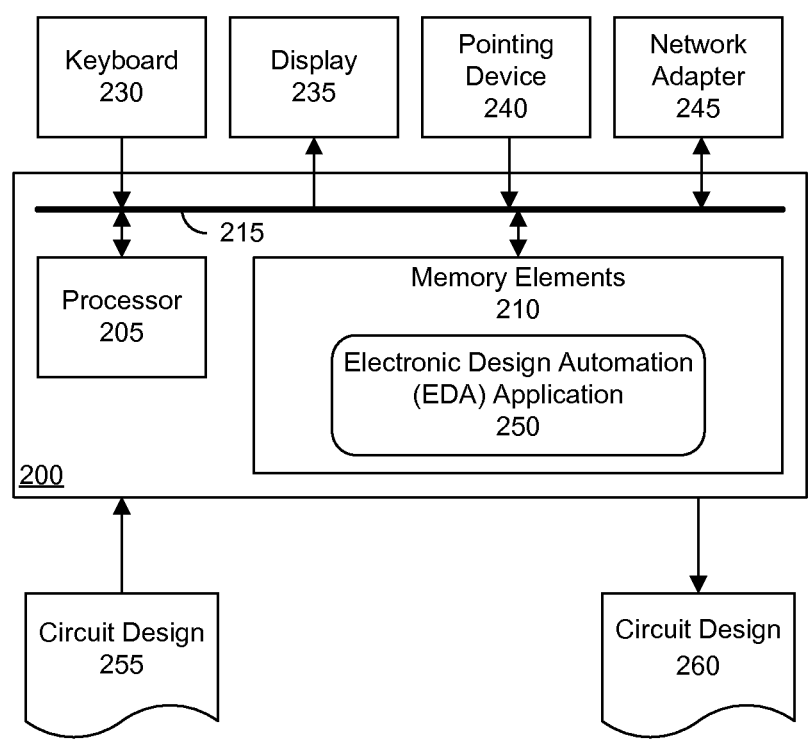
FIG. 2 is a block diagram illustrating an exemplary data processing system.

FIG. 2 is a block diagram illustrating an exemplary implementation of a data processing system (system) 200. System 200 includes at least one processor, e.g., a central processing unit (CPU), 205 coupled to memory elements 210 through a system bus 215 or other suitable circuitry. System 200 stores program code within memory elements 210. Processor 205 executes the program code accessed from memory elements 210 via system bus 215. In one aspect, system 200 is implemented as a computer that is suitable for storing and/or executing program code. It should be appreciated, however, that system 200 may be implemented in the form of any system including a processor and memory that is capable of performing the functions and/or operations described within this specification.

Memory elements 210 include one or more physical memory devices such as, for example, a local memory and one or more bulk storage devices. Local memory refers to random access memory or other non-persistent memory device(s) generally used during actual execution of the program code. The bulk storage device(s) may be implemented as a hard disk drive (HDD), solid state drive (SSD), or other persistent data storage device. System 200 also may include one or more cache memories (not shown) that provide temporary storage of at least some program code in order to reduce the number of times program code must be retrieved from the bulk storage device during execution.

Input/output (I/O) devices such as a keyboard 230, a display device 235, and a pointing device 240 optionally may be coupled to system 200. The I/O devices may be coupled to system 200 either directly or through intervening I/O controllers. A network adapter 245 also may be coupled to system 200 to enable system 200 to become coupled to other systems, computer systems, remote printers, and/or remote storage devices through intervening private or public networks. Modems, cable modems, Ethernet cards, and wireless transceivers are examples of different types of network adapter 245 that may be used with system 200.

As pictured in FIG. 2, memory elements 210 store an electronic design automation application (EDA application) 250. EDA Application 250 is configured to perform operations including, but not limited to place and route for a circuit design. EDA application 250, being implemented in the form of executable program code, is executed by system 200. As such, application 250 is considered part of system 200.

System 200, in executing EDA application 250, operates upon a received circuit design 255 to perform processes such as place and/or route. In performing place and/or route upon circuit design 255, system 200 performs the various operations described within this disclosure in relation to budgeting and/or re-budgeting. System 200 outputs circuit design 260, which includes re-processed, e.g., re-budgeted, delay budgets for one or more or all connections. Circuit design 260 may be placed or partially placed and/or routed or partially routed. In any case, EDA application 250 and any data items utilized by EDA application 250 in performing the operations described within this disclosure are functional data structures that impart functionality when employed as part of system 200. Circuit design 255 and circuit design 260, regardless of programmatic form, are functional data structures that impart functionality when implemented within an IC.

Figure 3:
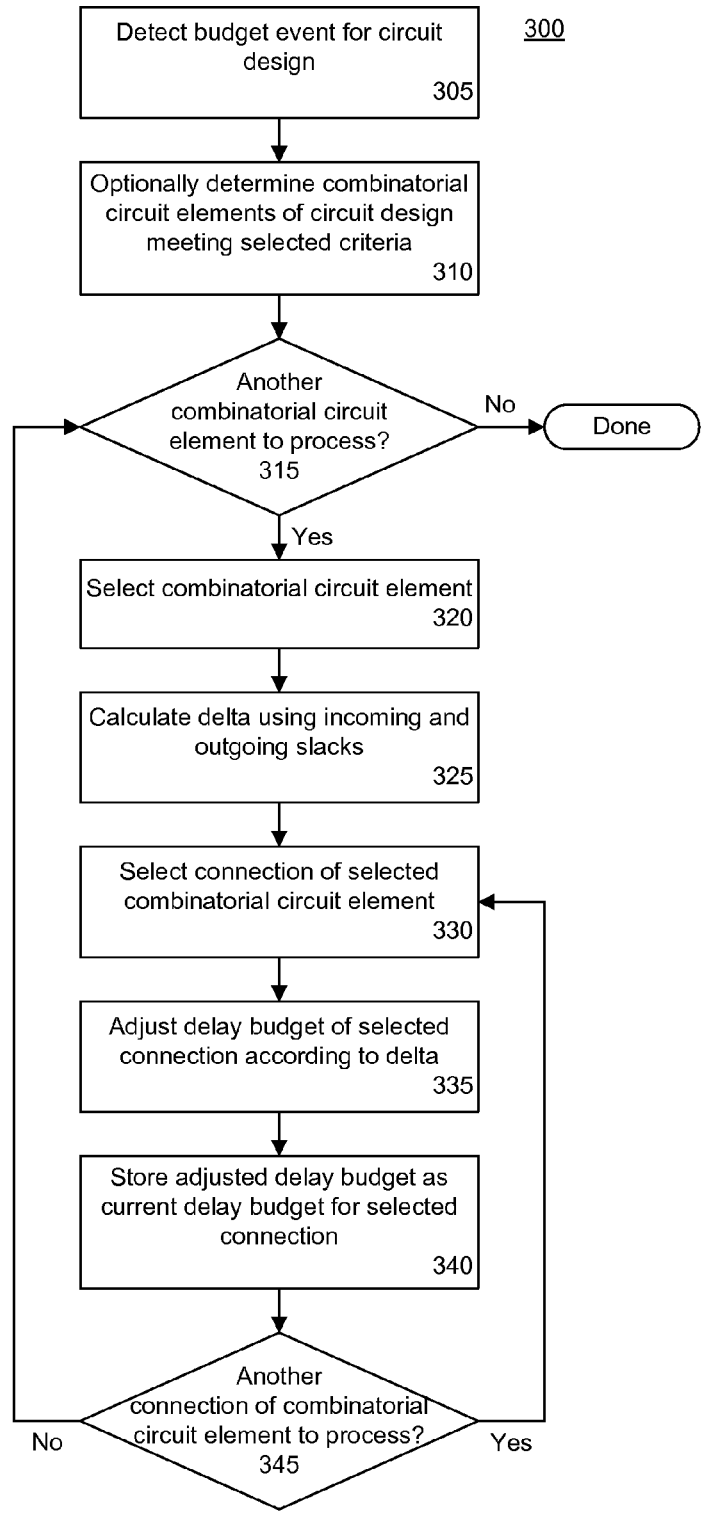
FIG. 3 is a flow chart illustrating an exemplary method of re-budgeting connections of a circuit design.

FIG. 3 is a flow chart illustrating an exemplary method 300 of re-budgeting connections of a circuit design. Method 300 may be performed by a system such as system 200 described with reference to FIG. 2. Method 300 begins in a state in which a circuit design is loaded into the system for processing.

The circuit design is specified in programmatic form and has undergone synthesis. Synthesis refers to the process of converting an abstract, programmatic description of a circuit into a low-level design implementation referred to herein as the "circuit design." The abstract programmatic description of the circuit describes behavior of the circuit and, as such, may be referred to as a "behavioral description" of the circuit. The behavioral description of the circuit is also referred to as a register transfer level (RTL) description and is specified using a hardware description language (HDL). The low level design implementation, i.e., the "circuit design" for purposes of FIG. 3, typically is specified as a plurality of inter-connected logic gates.

Delay information may be included within the circuit design or specified in one or more separate files associated with the circuit design. In general, delay of a path and/or a connection refers to the amount of time needed for an electrical signal to propagate from a start point to an end point of the path and/or connection. One way of specifying delay information is by specifying "slack" for a path and/or a connection. The term "slack" means the difference between the required delay, per the circuit design and/or design requirements, for a path and/or connection, and the estimated delay for the path and/or connection. A path and/or connection, as the case may be, having a positive slack means that the estimated delay is less than the required delay. The path and/or connection meets or exceeds the timing requirement. The signal of the path and/or the connection may be delayed an additional amount less than or equal to the slack without affecting the overall delay of the circuit. Negative slack means that the estimated delay for the connection and/or the path is larger than the required delay. A negative slack means that the path and/or connection is not meeting, e.g., is failing, the timing requirement.

The delay information includes, but is not limited to, estimated delay for paths and/or connections, delay requirements for paths, and delay budgets for connections. As discussed, delay requirements are specified as part of the design specification. Estimated delay is calculated by a system as described with reference to FIG. 2. The EDA application executed by the system, for example, may include a timing engine configured to estimate delays for paths and/or connections. With regard to a programmable IC, for example, the interconnect circuitry is well defined thereby allowing the timing engine to calculate accurate estimates of delay for paths and/or connections.

The system further may calculate delay budgets for connections. Expression 1 below is one exemplary technique for determining or calculating a delay budget for a connection.

$$\text{delay budget} = \frac{\text{connection\_delay} + (\text{target\_slack} - \text{connection\_slack})}{\text{longest\_path\_length}} \quad (1)$$

Referring to expression 1, the variable "connection_delay" is the delay of the connection for which the delay budget is being determined. The connection_delay is calculated, or estimated, by the system. The variable "target_slack" is the slack that the system is trying to achieve for the path and against which the system is delay budgeting. The target_slack may be set to a positive number in some cases, set to zero in other cases, and set to a negative number in other cases. As circuit development, e.g., placement and/or routing, progresses, the target slack may be changed. The goal of the system is to find delay budgets where replacement of delays with the delay budgets results in a situation where the worst case negative slack of the circuit design is equal to the target_slack. The variable "connection_slack" is the worst path slack passing through the connection as determined by the system. The variable "longest_path_length" is the worst case path slack passing through the connection and is also identified by the system.

It should be appreciated that expression 1 is provided for purposes of illustration only. Delay budgets for connections of paths of the circuit design may be determined and/or calculated using any of a variety of different delay budgeting techniques known to the skilled artisan. In this regard, the particular way in which the circuit design is at least initially delay budgeted is not intended to be limiting of the inventive arrangements described within this disclosure.

Continuing with FIG. 3, in block 305, the system detects a budget event for the circuit design. As defined within this disclosure, a "budget event" refers to a change to the circuit design that is made during placement and/or routing of the circuit design. The change that is detected as the budget event may or may not be a change to the particular connection or path including the connection that is re-budgeted. In another aspect, a budget event is a change in placement and/or routing that causes a change in estimated delay of an incoming connection to a combinatorial circuit element and/or a change in estimated delay of an outgoing connection from a combinatorial circuit element in a path. In still another aspect, a budget event is a change in placement and/or routing that causes a budget violation to occur for an incoming connection to a combinatorial circuit element and/or an outgoing connection from a combinatorial circuit element in a path.

The system performs re-budgeting of connections responsive to the detected budget event. In one aspect, however, the system may re-budget one or more connections in the circuit design regardless of whether such connection(s) have a delay budget violation subsequent to the budget event and/or regardless of whether the connection(s) exhibit a change in estimated delay when comparing estimated delay before the budget event compared to estimated delay after the budget event. For example, the system, responsive to detecting a budget event, may re-budget each connection in the circuit design.

In another aspect, the system may re-budget one or more connections that meet one or more selected criteria responsive to detecting the budget event. In one example, a criterion that is applied is whether a combinatorial circuit element has an incoming and/or an outgoing connection with a delay budget violation. The system determines which connections of combinatorial circuit elements have a delay budget violation responsive to the budget event. A delay budget violation means that the estimated delay of the connection exceeds the delay budget for the connection. The connection, therefore, has a negative slack.

In another example, a criterion that is applied is whether a combinatorial circuit element has an incoming or an outgoing connection in which the estimated delay changed. The system determines combinatorial circuit elements with a connection having an estimated delay that changed responsive to the budget event, i.e., where the estimated delay of the connection after the budget event is different than the estimated delay of the connection prior to the budget event.

Accordingly, in block 310, the system optionally determines combinatorial circuit elements of the circuit design that meet the selected criteria. The system determines a subset of combinatorial circuit elements that meet the specified criterion (or criteria) from the set of combinatorial circuit elements of the circuit design. Connections of the combinatorial circuit elements determined in block 310 require re-budgeting. As noted, the criteria may include any incoming or outgoing connection for a combinatorial circuit element having a delay budget violation and/or a changed estimated delay, or the like.

In block 315, the system determines whether another combinatorial circuit element remains for processing, e.g., re-budgeting. For example, in the case where the system does not perform any filtering of combinatorial circuit elements as described with reference to block 310, the system determines whether another combinatorial circuit element of the circuit design exists that has not yet been processed. In cases where the system does determine a subset of combinatorial circuit elements as described with reference to block 310, the system determines whether another combinatorial circuit element of the determined subset exists that has not yet been processed. In either case, the system selects a combinatorial circuit element that has not yet been processed from those available for selection for processing, i.e., re-budgeting in block 320.

In block 325, the system calculates a delta for the selected combinatorial circuit element. The delta is calculated using an incoming slack and an outgoing slack of the selected combinatorial circuit element responsive to the budget event. The delta may be a difference or a function of the difference of the incoming and outgoing slack and is described in greater detail with reference to FIG. 4.

In block 330, the system selects a connection that has not yet been processed of the selected combinatorial circuit element for processing. In block 335, the system adjusts the delay budget of the selected connection according to the delta calculated in block 330. For the selected connection, the system may increase the delay budget, decrease the delay budget, or leave the delay budget unchanged. In general, the system adds the delta to the delay budget for an outgoing connection of the selected combinatorial circuit element. The system subtracts the delta from the delay budget for an incoming connection of the selected combinatorial circuit element. In this regard, the system first determines whether the connection is an incoming connection or an outgoing connection of the combinatorial circuit element and adjusts the delay budget accordingly. The adjusting of delay budgets is described in greater detail with reference to FIG. 4.

In block 340, the system stores the adjusted delay budget for the selected connection as the current delay budget for the selected connection. In cases where the system determines that a connection has a delay budget violation responsive to the detected budget event, the delay budget violation is removed as a consequence of the re-budgeting. By removing the delay budget violation from the connection, the number of possible solutions to the placement and/or routing of the circuit design is increased, thereby increasing the likelihood of achieving a feasible and high quality placement and/or routing of the circuit design. In cases where the connection had a delay budget violation prior to the detected budget event, the delay budget violation is not made worse, e.g., is maintained constant by the re-budgeting.

In block 345, the system determines whether another connection of the selected combinatorial circuit element remains to be processed. If one or more connections of the combinatorial circuit element remain to be processed, method 300 loops back to block 330, where a next connection of the selected combinatorial circuit element that has not yet been processed is selected. If no further connections of the selected combinatorial circuit element remain for processing, then all connections of the currently selected combinatorial circuit element have been processed. As such, method 300 loops back to block 315 to process a next combinatorial circuit element or end.

The system performs re-budgeting only for connections with combinatorial circuit elements. For example, a connection having a combinatorial circuit element as a start point or an end point or a connection having a combinatorial element for both the start point and the end point may be re-budgeted. By performing re-budgeting as described after each atomic placement and/or routing operation, i.e., any placement and/or routing change to the circuit design, the system is able to calculate more accurate delay budgets for the connections. Further, the system is able to determine the actual effect of the operation performed and detected as the budget event upon the budget violations of the connection(s), while also taking into account local re-budgeting after the operation.

Figures 1, 4:
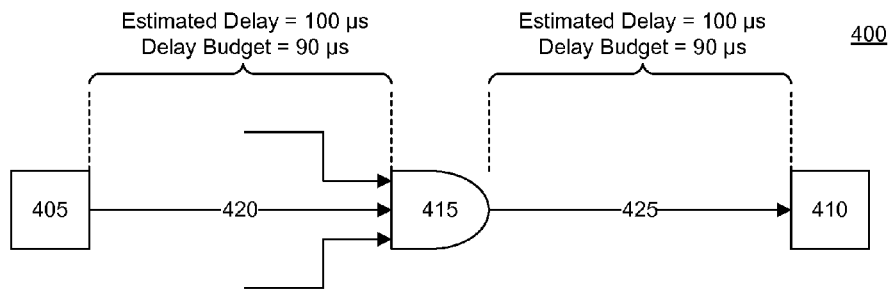
Figures 2, 4:
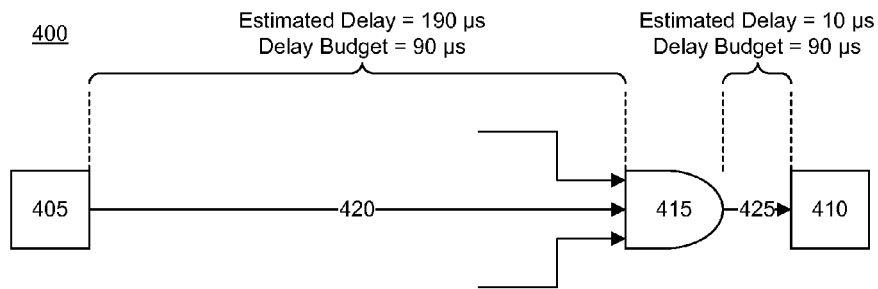
Figures 3, 4:
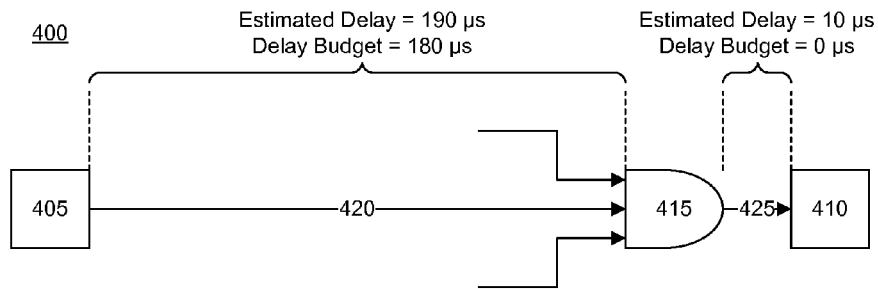

FIGS. 4-1 through 4-3 are block diagrams illustrating calculation of the delta and adjustment of delay budgets using the delta as described with reference to the exemplary method of FIG. 3. Referring to FIG. 4-1, a path 400 of a circuit design is shown. Path 400 has a synchronous circuit element 405 as a start point and a synchronous circuit element 410 as an end point. A combinatorial circuit element 415 is located in path 400. As noted, synchronous circuit elements are clocked, while combinatorial circuit elements are not. Path 400 is divided by combinatorial circuit element 415 into a connection 420 and a connection 425. Connection 420 is serially connected with connection 425. Connection 420 has synchronous circuit element 405 as a start point and combinatorial circuit element 415 as an end point. Connection 425 has combinatorial circuit element 415 as a start point and synchronous circuit element 410 as an end point.

FIG. 4-1 illustrates a current state of path 400 during placement and/or routing. As pictured, the delay for path 400, as estimated by the system, is 200 µs. The requirement for path 400, per the design specification, is 180 µs. The system has determined delay budgets for connections 420 and 425. Connection 420 has a delay budget of 90 µs and an estimated delay of 100 µs. Connection 425 has a delay budget of 90 µs and an estimated delay of 100 µs. The sum of the estimated delay of connection 420 and the estimated delay of connection 425 is 200 µs. The sum of the delay budget for connection 420 and the delay budget for connection 425 is 180 µs. Thus, connection 420 has a negative slack of 10 µs (−10 µs). Connection 425 has a negative slack of 10 µs (−10 µs). Negative slack for a connection means that the connection has a delay budget violation. Referring to FIG. 4-1, each of connections 420 and 425 is said to have a delay budget violation of 10 µs.

FIG. 4-2 illustrates a different state of path 400 after an atomic placement operation is performed by the system. As pictured, the location of combinatorial circuit element 415 has been changed. More particularly, combinatorial circuit element 415 has been moved closer to synchronous circuit element 410 and farther from synchronous circuit element 405. In consequence, the length of connection 420 is increased; while the length of connection 425 is decreased. The estimated delay for connection 420 has increased from 100 µs to 190 µs in consequence of the movement of combinatorial circuit element 415. Further, the estimated delay for connection 425 has decreased from 100 µs to 10 µs. The budget for each of connections 420 and 425, however, remains constant and set to 90 µs. As such, connection 420 has a delay budget violation of 100 µs, which is a negative slack of 100 µs. Connection 425 has a positive slack of 80 µs.

While the slack for path 400 remains at −20 µs, conventional placement and/or routing tools operate on a per connection basis and not on a path as a whole. As such, the relocation of combinatorial circuit element 415 as illustrated in FIG. 4-2 is interpreted as undesirable or a worse placement for path 400 than that of FIG. 4-1 since the delay budget violation for connection 420 grew worse. Such is the case despite the total slack of path 400 remaining unchanged. The worsening of the delay budget violation for connection 420 is not offset, for example, by the improvement in the estimated delay for connection 425. As such, in a conventional system without dynamic re-budgeting of connections, the placement of FIG. 4-2 is discarded.

Referring to FIG. 4-2, a delta is calculated for combinatorial circuit element 415 as described generally with reference to block 325 of FIG. 3. The incoming slack of combinatorial circuit element 415 after the budget event is the slack of connection 420, which is 90 µs−190 µs=−100 µs. The outgoing slack of combinatorial circuit element 415 after the budget event is the slack of connection 425, which is 90 µs−10 µs=80. The delta is (incoming_slack−outgoing_slack)/2. This results in a delta for combinatorial circuit element 415 of (−100 µs−80 µs)/2=−180 µs/2=−90 µs.

As previously discussed, for incoming connections, the delay budget is adjusted by subtracting the delta from the prior delay budget. Thus, the adjusted delay budget for connection 420 is the original delay budget of FIG. 4-1, which is 90 µs, minus the delta, which is −90 µs. Thus, the adjusted delay budget for connection 420 is 90 µs−(−90 µs)=180 µs. For outgoing connections, the delay budget is adjusted by adding the delta to the prior delay budget. Thus, the adjusted delay budget for connection 425 is the original delay budget of FIG. 4-1, which is 90 µs, to which the delta of −90 µs is added. Thus, the adjusted delay budget for connection 425 is 90 µs+(−90 µs)=0 µs.

FIG. 4-3 illustrates the same state of path 400 as illustrated in FIG. 4-2. In FIG. 4-3, however, the system has performed re-budgeting. As pictured, the system has increased the delay budget for connection 420 from 90 µs to 180 µs. Further, the system has decreased the delay budget for connection 425 from 90 µs to 0 µs. Each of connections 420 and 425 again has a delay budget violation of −10 µs.

Because of the re-budgeting that is performed, connection 420 still has a slack of −10 µs, i.e., a budget violation of −10 µs. Similarly, connection 425 still has a slack of −10 µs, i.e., a budget violation of −10 µs. Accordingly, the relocation of synchronous circuit element 415 and re-budgeting performed means that, at least in terms of delay budget violations for connections, the placement of FIG. 4-1 is essentially equivalent to the placement of FIG. 4-3. Thus, the placement of FIG. 4-3 may be considered by the system, whereas such a placement would not be considered without re-budgeting. While the delay budget violation may not be removed in all cases, the delay budget violations are not made worse, which effectively increases the exploration space, i.e., the potential solutions that are considered since such potential solutions are not considered a "worse" move in terms of delay budget violations. As such, re-budgeting increases exploration space, e.g., the number of possible solutions, considered by the system thereby increasing the quality of the placement and/or routing of the circuit design.

In accordance with the inventive arrangements described within this disclosure, connections are dynamically re-budgeted during placement and/or routing. Responsive to detecting a budget event for a circuit design, a delta is calculated using an incoming slack and an outgoing slack for a selected combinatorial circuit element. The delay budget(s) for connection(s) of the selected combinatorial circuit element are adjusted according to the delta responsive to detecting the budget event. By re-budgeting connections dynamically, e.g., responsive to a budget event, rather than using unchanging delay budgets, the system is able to explore a larger number of potential circuit implementation options, thereby providing an improved quality of result for placement and/or routing of the circuit design.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

The terms "a" and "an," as used herein, are defined as one or more than one. The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also may be coupled mechanically, electrically, or communicatively linked through a communication channel, pathway, network, or system.

The term "and/or" as used herein refers to and encompasses any and all possible combinations of one or more of the associated listed items. It will be further understood that the terms "includes" and/or "including," when used in this disclosure, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Within this disclosure, the same reference characters are used to refer to terminals, signal lines, wires, and their corresponding signals. In this regard, the terms "signal," "wire," "connection," "terminal," and "pin" may be used interchangeably, from time-to-time, within this disclosure. It also should be appreciated that the terms "signal," "wire," or the like may represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be.

One or more aspects described within this disclosure may be realized in hardware or a combination of hardware and software. One or more aspects may be realized in a centralized fashion in one system or in a distributed fashion where different elements are spread across several interconnected systems. Any kind of data processing system or other apparatus adapted for carrying out at least a portion of the methods described herein is suited.

One or more aspects further may be embedded in a computer program product, which includes all the features enabling the implementation of the methods described herein. The computer program product includes a data storage medium which is a non-transitory computer-usable or computer-readable medium, storing program code that, when loaded and executed in a system including a processor, causes the system to initiate and/or perform at least a portion of the functions and/or operations described within this disclosure. Examples of data storage media may include, but are not limited to, optical media, magnetic media, magneto-optical media, computer memory such as random access memory, a bulk storage device, e.g., hard disk, or the like.

Accordingly, the flowchart and block diagrams in the Figures illustrate the architecture, functionality, and operation of possible implementations of systems, methods and computer program products according to various aspects of the inventive arrangements disclosed herein. In this regard, each block in the flowchart or block diagrams may represent a module, segment, or portion of code, which includes one or more executable instructions for implementing the specified logical function(s). It should also be noted that, in some alternative implementations, the functions noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The terms "computer program," "software," "application," "computer-usable program code," "program code," "executable code," variants and/or combinations thereof, in the present context, mean any expression, in any language, code or notation, of a set of instructions intended to cause a data processing system to perform a particular function either directly or after either or both of the following: a) conversion to another language, code, or notation; b) reproduction in a different material form. For example, program code may include, but is not limited to, a subroutine, a function, a procedure, an object method, an object implementation, an executable application, an applet, a servlet, a source code, an object code, a shared library/dynamic load library and/or other sequence of instructions designed for execution on a computer system.

Thus, throughout this disclosure, statements utilizing terms such as "processing" or "computing" or "calculating" or "determining" or "displaying" or the like, refer to the action and processes of a data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

The corresponding structures, materials, acts, and equivalents of all means or step plus function elements in the claims below are intended to include any structure, material, or act for performing the function in combination with other claimed elements as specifically claimed.

The features described within this disclosure may be embodied in other forms without departing from the spirit or essential attributes thereof. Accordingly, reference should be made to the following claims, rather than to the foregoing disclosure, as indicating the scope of such features and implementations.

What is claimed is:
1. A method, comprising:
   detecting a budget event for a circuit design;

responsive to detecting the budget event, calculating, using a processor, a delta for a selected combinatorial circuit element of the circuit design using an incoming slack and an outgoing slack of the selected combinatorial circuit element;

wherein calculating a delta comprises subtracting the outgoing slack of the selected combinatorial circuit element from the incoming slack of the selected combinatorial circuit element and dividing a result of the subtraction by two; and adjusting, using the processor, a delay budget for a connection of the selected combinatorial circuit element using the delta responsive to detecting the budget event.

2. The method of claim 1, further comprising:
determining a combinatorial circuit element from a plurality of combinatorial circuit elements of the circuit design as the selected combinatorial circuit element according to whether a connection of the combinatorial circuit element meets a selected criterion.

3. The method of claim 1, wherein the budget event is a change in placement of the circuit design.

4. The method of claim 1, wherein the budget event is a change in routing of the circuit design.

5. The method of claim 1, wherein adjusting the delay budget comprises:
responsive to determining that a connection of the selected combinatorial circuit element is an incoming connection, subtracting the delta from the delay budget of the connection.

6. The method of claim 1, wherein adjusting the delay budget comprises:
responsive to determining that a connection of the selected combinatorial circuit element is an outgoing connection, adding the delta to the delay budget of the connection.

7. A system, comprising:
a processor programmed to initiate executable operations comprising:
detecting a budget event for a circuit design;
responsive to detecting the budget event, calculating a delta for a selected combinatorial circuit element of the circuit design using an incoming slack and an outgoing slack of the selected combinatorial circuit element;
wherein calculating a delta comprises subtracting the outgoing slack of the selected combinatorial circuit element from the incoming slack of the selected combinatorial circuit element and dividing a result of the subtraction by two; and
adjusting, using the processor, a delay budget for a connection of the selected combinatorial circuit element using the delta responsive to detecting the budget event.

8. The system of claim 7, wherein the processor is further programmed to initiate executable operations comprising:
determining a combinatorial circuit element from a plurality of combinatorial circuit elements of the circuit design as the selected combinatorial circuit element according to whether a connection of the combinatorial circuit element meets a selected criterion.

9. The system of claim 7, wherein the budget event is a change in placement of the circuit design.

10. The system of claim 7, wherein the budget event is a change in routing of the circuit design.

11. The system of claim 7, wherein adjusting the delay budget comprises:
responsive to determining that a connection of the selected combinatorial circuit element is an incoming connection, subtracting the delta from the delay budget of the connection.

12. The system of claim 7, wherein adjusting the delay budget comprises:
responsive to determining that a connection of the selected combinatorial circuit element is an outgoing connection, adding the delta to the delay budget of the connection.

13. A non-transitory computer-readable medium having instructions stored thereon which, when executed by a processor, perform a method comprising:
detecting a budget event for a circuit design;
responsive to detecting the budget event, calculating, using the processor, a delta for a selected combinatorial circuit element of the circuit design using an incoming slack and an outgoing slack of the selected combinatorial circuit element;
wherein calculating a delta comprises subtracting the outgoing slack of the selected combinatorial circuit element from the incoming slack of the selected combinatorial circuit element and dividing a result of the subtraction by two; and
adjusting, using the processor, a delay budget for a connection of the selected combinatorial circuit element using the delta responsive to detecting the budget event.

14. The non-transitory computer-readable medium of claim 13, wherein the method further comprises:
determining a combinatorial circuit element from a plurality of combinatorial circuit elements of the circuit design as the selected combinatorial circuit element according to whether a connection of the combinatorial circuit element meets a selected criterion.

15. The non-transitory computer-readable medium of claim 13, wherein the budget event is a change in placement of the circuit design.

16. The non-transitory computer-readable medium of claim 13, wherein the budget event is a change in routing of the circuit design.

17. The non-transitory computer-readable medium of claim 13, wherein adjusting the delay budget comprises:
determining whether the connection of the selected combinatorial circuit element is an incoming connection or an outgoing connection; and
responsive to the determination, subtracting the delta from the delay budget of the connection or adding the delta to the delay budget of the connection.

\* \* \* \* \*